United States Patent
Sawaguchi (10) Patent No.: US 9,282,015 B2
(45) Date of Patent: Mar. 8, 2016

(54) NETWORK RELAY DEVICE

(71) Applicant: Hitachi Metals, Ltd., Tokyo (JP)

(72) Inventor: Chikara Sawaguchi, Tsukuba (JP)

(73) Assignee: Hitachi Metals, Ltd., Tokyo (JP)

( * ) Notice: Subject to any disclaimer, the term of this patent is extended or adjusted under 35 U.S.C. 154(b) by 130 days.

(21) Appl. No.: 14/161,444

(22) Filed: Jan. 22, 2014

(65) Prior Publication Data

US 2014/0293771 A1 Oct. 2, 2014

(30) Foreign Application Priority Data

Mar. 28, 2013 (JP) ................................ 2013-070357

(51) Int. Cl.
*H04L 12/26* (2006.01)
(52) U.S. Cl.
CPC .................................. *H04L 43/0811* (2013.01)
(58) Field of Classification Search
None
See application file for complete search history.

(56) References Cited

U.S. PATENT DOCUMENTS

| | | | | | |
|---|---|---|---|---|---|
| 8,576,703 | B2 * | 11/2013 | Dholakia | ............... | H04L 45/586 370/220 |
| 8,929,376 | B2 * | 1/2015 | Stark | .................... | H04L 49/9047 370/392 |
| 2002/0093961 | A1 * | 7/2002 | Sharma | ............... | H04L 41/0806 370/392 |
| 2002/0097672 | A1 * | 7/2002 | Barbas | ................. | G06F 11/2005 370/216 |
| 2002/0167896 | A1 * | 11/2002 | Puntambekar | ................. | 370/216 |
| 2002/0176355 | A1 * | 11/2002 | Mimms et al. | ................. | 370/216 |
| 2003/0119555 | A1 * | 6/2003 | Friesen | ............... | H04L 12/2602 455/560 |
| 2003/0174709 | A1 * | 9/2003 | Shankar | .................. | H04L 41/12 370/395.31 |
| 2009/0248923 | A1 * | 10/2009 | Wang | ...................... | H04L 12/66 710/62 |
| 2009/0259773 | A1 * | 10/2009 | Lai | ..................... | H04L 29/12839 710/14 |
| 2010/0057961 | A1 * | 3/2010 | Mi | ....................... | H04L 12/6418 710/110 |
| 2010/0085978 | A1 * | 4/2010 | Ramankutty | ............ | H04L 12/14 370/401 |
| 2010/0124933 | A1 * | 5/2010 | Chowdhury | ........ | H04L 12/5695 455/453 |
| 2011/0055822 | A1 * | 3/2011 | Hsieh | .................... | H04L 41/082 717/173 |
| 2011/0069711 | A1 * | 3/2011 | Jha | ....................... | H04L 12/4625 370/395.53 |
| 2011/0142065 | A1 * | 6/2011 | Reynov | ................... | H04L 49/10 370/419 |

FOREIGN PATENT DOCUMENTS

JP 2010-157783 A 7/2010

* cited by examiner

*Primary Examiner* — Jenee Williams
(74) *Attorney, Agent, or Firm* — Crowell & Moring LLP (57) ABSTRACT

In a chassis-type network relay device, fault tolerance for the continuity monitoring function of Ethernet (Registered Trademark) OAM is improved. A first management card and a second management card serving as a main management card and a backup management card have continuity monitoring units which generate monitoring frames for checking continuity between devices and transmit the monitoring frames to a given line card, respectively. Each of a plurality of line cards has a transmission source selecting unit which, when having received respective monitoring frames from both management cards, selects one of the monitoring frames and transmits the selected monitoring frame from a given port.

5 Claims, 12 Drawing Sheets

SW = Switching Device
NW = Network
MEP = Maintenance End Point

FIG. 2

SW = Switching Device
MC = Management Card
MCTL = Management Unit
LCTL = Processing Unit
SBY = Stand-by State
ACT = Active State
BP = Back Plane
LC = Line Card
P = Port
CCM = Continuity Check Message

FIG. 3

SW = Switching Device
MC = Management Card
MCTL = Management Unit
LCTL = Processing Unit
SBY = Stand-by State
ACT = Active State
BP = Back Plane
LC = Line Card
SEL = Selecting Unit
P = Port
CCM = Continuity Check Message

```
SW = Switching Device
MC = Management Card
MCTL = Management Unit
LCTL = Processing Unit
BP = Back Plane
LC = Line Card
LOC = Loss of Continuity
RDI = Remote Defect Indication
ICCM = Internal Continuity Check Message
RDIMm1 = Internal Continuity Check Message Frame
P = Port
CCM = Continuity Check Message
```

FIG. 6

SW = Switching Device
MC = Management Card
MCTL = Management Unit
LCTL = Processing Unit
SBY = Stand-by State
ACT = Active State
BP = Back Plane
LC = Line Card
SEL = Selecting Unit
LOC = Loss of Continuity
RDI = Remote Defect Indication
P = Port
CCM = Continuity Check Message

ICCTBL1

| MONITORING SUBJECT | CONTINUITY STATE (LOC/RDI) |
|---|---|
| MCm | RDI |
| MCb | NORMAL |

```
LC    = Line Card
TLBLU = Table Unit
FDB   = Address Table
ICCTBL = Internal Continuity Monitoring Table
IF    = Interface
FLCTL = Frame Processing Unit
ICCCTL = Internal Continuity Monitoring Unit
CCCTL = Monitoring Frame Processing Unit
SEL   = Selecting Unit
FIF   = Fabric Interface
P     = Port
LOC   = Loss of Continuity
RDI   = Remote Defect Indication
```

FIG. 9A

IF = Interface
LC = Line Card
SW = Switching Unit
MC = Management Card
TBLU = Table Unit
LOC = Loss of Continuity
RDI = Remote Defect Indication
OAMCTL = Continuity Monitoring Unit CCTBL = Continuity Monitoring Table
ICCTBL = Internal Continuity Monitoring Table
MGCTL = Device Management Unit
ICCCTL = Internal Continuity Monitoring Table

FIG. 9B
ICCTBL2

| MONITORING SUBJECT | CONTINUITY STATE (LOC/RDI) |
|---|---|
| LC1 | LOC |
| LC2 | NORMAL |
| ⋮ | ⋮ |
| LCn | NORMAL |

FIG. 9C
CCTBL

| MONITORING SUBJECT | CONTINUITY STATE (LOC/RDI) |
|---|---|
| SWxx | NORMAL |
| SWyy | NORMAL |
| ⋮ | ⋮ |

SW' = Switching Device
MC' = Management Card
MCTL = Management Unit
LCTL = Processing Unit
SBY = Stand-by State
ACT = Active State
BP = Back Plane
LC = Line Card
P = Port
CCM = Continuity Check Message

FIG. 11B

SW' = Switching Device
MC' = Management Card
MCTL = Management Unit
LCTL = Processing Unit
SBY = Stand-by State
ACT = Active State
BP = Back Plane
LC = Line Card
P = Port
CCM = Continuity Check Message

NETWORK RELAY DEVICE

CROSS-REFERENCE TO RELATED APPLICATION

The present application claims priority from Japanese Patent Application No. 2013-070357 filed on Mar. 28, 2013, the content of which is hereby incorporated by reference into this application.

TECHNICAL FIELD OF THE INVENTION

The present invention relates to a network relay device, for example, a chassis-type network relay device having functions of Ethernet (Registered Trademark) OAM.

BACKGROUND OF THE INVENTION

For example, Japanese Patent Application Laid-Open Publication No. 2010-157783 (Patent Document 1) discloses a communication system in which loopback information is added to an operation maintenance management frame to set an MEP/MIP at each port, and thereby capable of suppressing cost at each port and detecting a communication device having a fault due to a physical failure or transfer setting error in the device.

SUMMARY OF THE INVENTION

For example, a switching device referred to as a so-called chassis-type switching device in which a plurality of line cards and a management card are mounted in one chassis (in other words, network relay device) has been known. The management card has a function of managing the whole switching device including the management of setting, conditions and others of each line card. In many cases, the management card has a redundant configuration for improved reliability. In such a case, for example, the chassis-type switching device has a redundant management card composed of a master card and a backup card.

In recent years, in the Ethernet (Registered Trademark) network, a maintenance/administration function called Ethernet OAM (Operations, Administration and Maintenance) has been used. The Ethernet OAM is standardized as "ITU-T Y. 1731", "IEEE802. lag" and others. In the Ethernet OAM, a function referred to as CC (Continuity Check) is defined as one of its functions. This is a function of monitoring continuity between monitoring points called MEP (Maintenance End Point) by exchanging a frame called CCM (Continuity Check Message) between the monitoring points.

In such a circumstance, the inventor has studied a configuration in which the functions of the Ethernet OAM are provided in the chassis-type switching device having the redundant management card mounted therein. The study has revealed that a defect occurs in the continuity monitoring function (CC) of the Ethernet OAM when a fault occurs in a management card. Specifically, for example, the defect includes a case where an event that should not be detected as a fault is erroneously detected as a fault.

The present invention has been made in view of the problem mentioned above, and one object of the present invention is to improve fault tolerance for a continuity monitoring function of Ethernet OAM in a chassis-type network relay device. The above and other objects and novel characteristics of the present invention will be apparent from the description of the present specification and the accompanying drawings.

The following is a brief description of an outline of the typical invention disclosed in the present application.

A network relay device according to an embodiment includes a plurality of line cards and first and second management cards. Each of a plurality of line cards has a port and relays a frame. The first management card is connected to each of the plurality of line cards and manages them. Similarly, the second management card is connected to each of the plurality of line cards and manages them. One of the first and second management cards serves as a main management card and the other of the first and second management cards serves a backup management card which is used when the main management card has a fault. Here, each of the first and second management cards has a continuity monitoring unit which generates a monitoring frame for checking continuity between devices and transmits the monitoring frame to a given line card among the plurality of line cards. Each of the plurality of line cards has a monitoring frame processing unit which, when having received the monitoring frames from both of the first and second management cards, selects one of both monitoring frames and transmits the selected monitoring frame from the port.

The effects obtained by typical embodiments of the invention disclosed in the present application will be briefly described below. That is, it is possible to improve fault tolerance for a continuity monitoring function of Ethernet (Registered Trademark) OAM in a chassis-type network relay device.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiments, and the repetitive description thereof will be omitted.

<<Outline of Communication System>>

Figure 1:
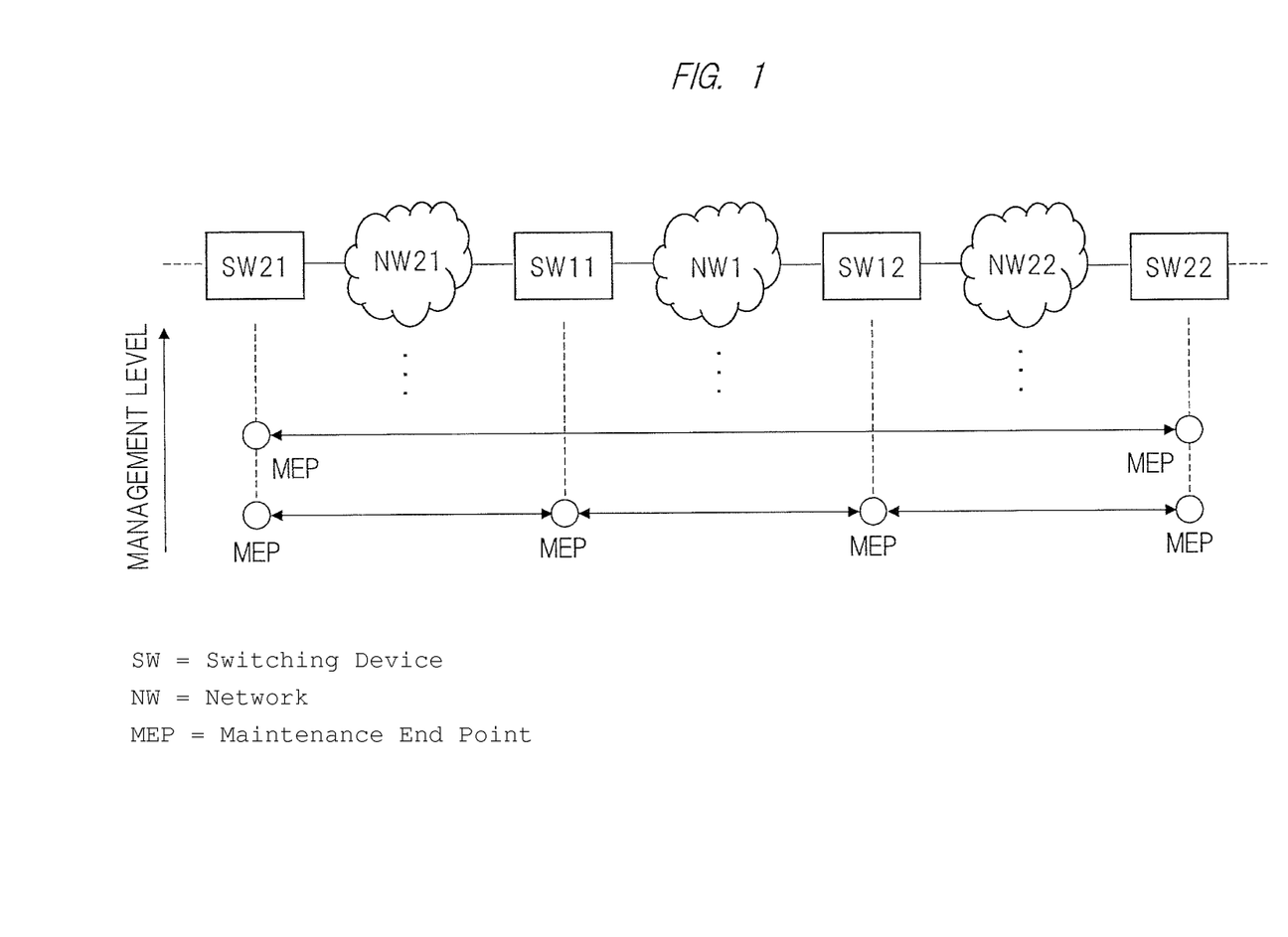
FIG. 1 is a schematic diagram showing an example of a configuration of a communication system to which a network relay device according to an embodiment of the present invention is applied.

FIG. 1 is a schematic diagram showing an example of a configuration of a communication on system to which a network relay device according to an embodiment of the present invention is applied. The communication system shown in FIG. 1 includes, for example, a plurality of switching devices (network relay devices) SW11, SW12, SW21, SW22, . . . and a plurality of networks NW1, NW21, NW22, . . . . The switching device SW11 and the switching device SW12 are connected via the network NW1, the switching device SW11 and the switching device SW21 are connected via the network NW21, and the switching device SW12 and the switching device SW22 are connected via the network NW22. Each of the networks NW1, NW21 and NW22 is, for example, an Ethernet (Registered Trademark) network, and is composed of communication lines and switching devices.

Each of the switching devices SW11, SW12, SW21 and SW22 has Ethernet OAM functions. As mentioned above, the Ethernet OAM functions include a function referred to as CC (Continuity Check) which is a function of monitoring continuity between monitoring points (MEP) by exchanging a CCM frame between the monitoring points. A management level and others referred to as MEG (Maintenance Entity Group) can be set at these monitoring points, and continuity monitoring sections (ME: Maintenance Entity) are determined based on the management level and others.

For example, as shown in FIG. 1, when the same low management level is set at each of the switching devices SW11, SW12, SW21 and SW22, respective sections between the switching device SW11 and the switching device SW12, between the switching device SW11 and the switching device SW21, and between the switching device SW12 and the switching device SW22 are determined to be monitoring sections (ME) where continuity is monitored. In this case, for example, each switching device receives a CCM frame having the same management level as a management level set at the switching device itself, and terminates (takes in) the CCM frame to carry out a prescribed process. At this time, as shown in FIG. 1, if the same high management level is set at the switching devices SW21 and SW22, a section between the switching device SW21 and the switching device SW22 is determined to be a monitoring section (ME) where continuity is monitored. In this case, the switching devices SW11 and SW12 each receive a CCM frame having a management level, higher than a management level set at the switching devices SW11 and SW12 themselves and just relay the received CCM frame.

The configuration of the communication system of this embodiment is not limited to the configuration shown in FIG. 1. For example, any system can be applied as long as switching devices each having the Ethernet OAM function are properly connected in an Ethernet network. Furthermore, a user is allowed to arbitrarily set monitoring points (MEP), management levels, and others on a necessary basis.

<<Configuration of Switching Device (Network Relay Device) and its Operation in Normal State>>

Figure 2:
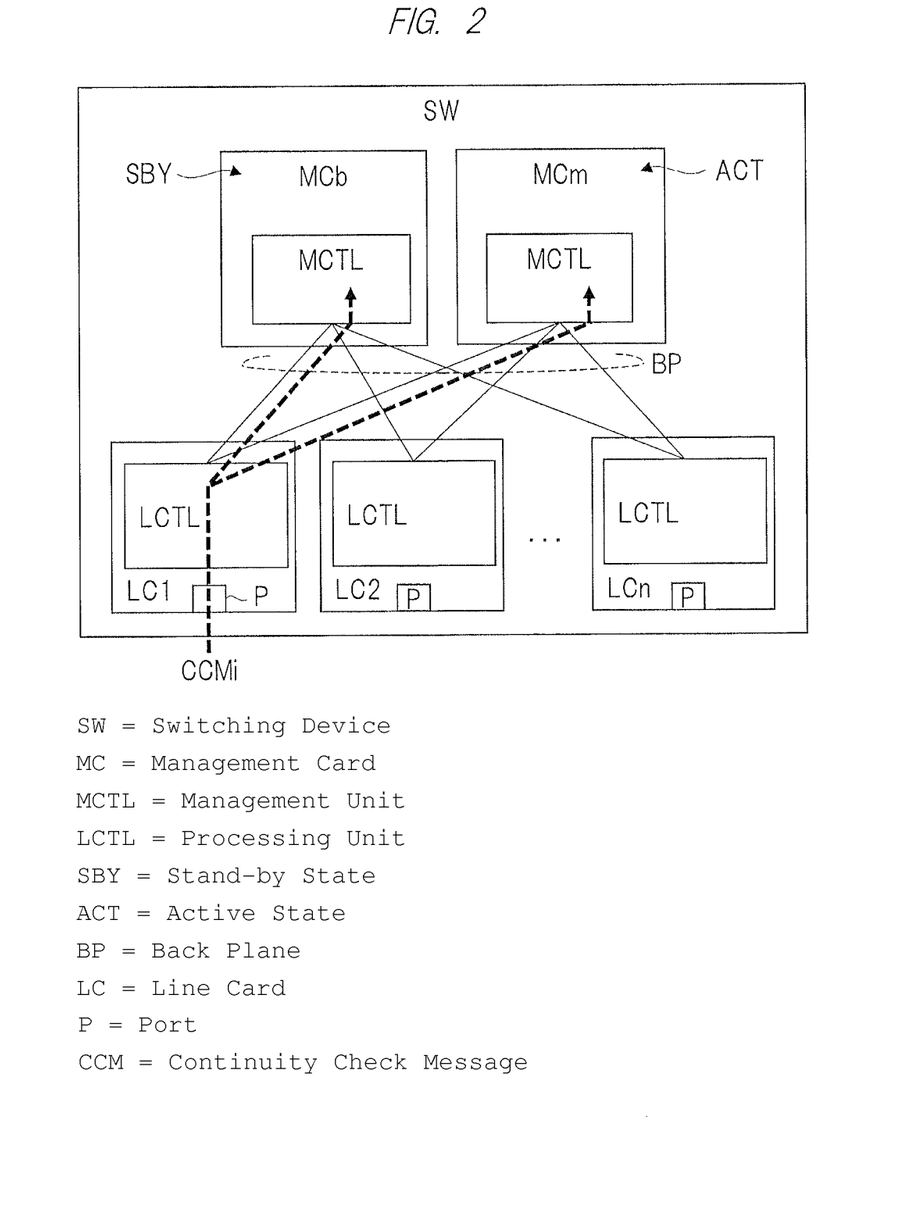
FIG. 2 is a schematic diagram showing an example of a configuration of a switching device of the communication system of FIG. 1 and an example of an operation of the switching device when receiving a CCM frame in the communication system.

FIG. 2 is a schematic diagram showing an example of a configuration of a switching device of the communication system of FIG. 1 and an example of an operation which the switching device executes when receiving a CCM frame in the communication system. The switching device (network relay device) SW of FIG. 2 is a so-called chassis-type switching device in which a plurality of line cards LC1 to LCn, a first management card MCm, and a second management card MCb are provided and these are mounted in one chassis. Each of the line cards LC1 to LCn has a port P and a processing unit LCTL, and the processing unit LCTL relays a frame. For example, each processing unit LCTL relays a frame to a different line card, and when the line card in which the processing unit LCTL is provided has a plurality of ports P, the processing unit LCTL relays a frame between the plurality of ports P.

The first management card MCm has a management unit MCTL and is connected to each of the plurality of line cards LC1 to LCn. Similarly, the second management card MCb has a management unit MCTL and is connected to each of the plurality of line cards LC1 to LCn. Each of the management units MCTL of the management cards MCm and mth manages the line cards LC1 to LCn. Typically, she management unit MCTL manages the various settings and operation states of the line cards LC1 to LCn. One of the management cards MCm and MCb (management card MCm in this case) serves as a main management card, and the other of the management cards MCm and MCb (management card Mob in this case) serves as a backup management card used when a fault occurs in the main management card. The line cards LC1 to LCn are connected to the management cards MCm and Mob via, for example, a back plane BP having a plurality of slots for inserting respective cards therein.

It is assumed in this configuration that the switching device SW is the mentoring point (MEP) shown in FIG. 1. When having received a CCM frame (monitoring frame) CCMi through the port P, the processing unit LCTL of each of the plurality of line cards LC1 to LCn (LC1 in this case) transmits the received CCM frame CCMi to both of the first and second management cards MCm and Mob. At the same time, the processing unit LCTL copies the CCM frame CCMi. As described above, the CCM frame CCMi is the frame for checking the continuity between devices and is generated by a different switching device.

The management unit MCTL of each of the management cards MCm and MCb determines whether the management unit MCTL has received a CCM frame CCMi transmitted from a line card (LC1 in this case) (in other words, a CCM frame CCMi transmitted from a different switching device) in a predetermined given reception period, and terminates (discards) the CCM frame CCMi. More specifically, a different switching device transmits a CCM frame CCMi at a predetermined transmission interval, and each management unit MCTL determines whether it has received the CCM frame CCMi in the reception period set to be 3.5 times as long as the transmission interval. When having received the CCM frame CCMi in the reception period, each management unit MCTL sets management information of the switching device corresponding to the transmission source of the CCM frame CCMi to "normal state". When failing to receive the CCM frame CCMi, each management unit MCTL sets the management information to "LOC state" (which will be described in detail later).

Figure 3:
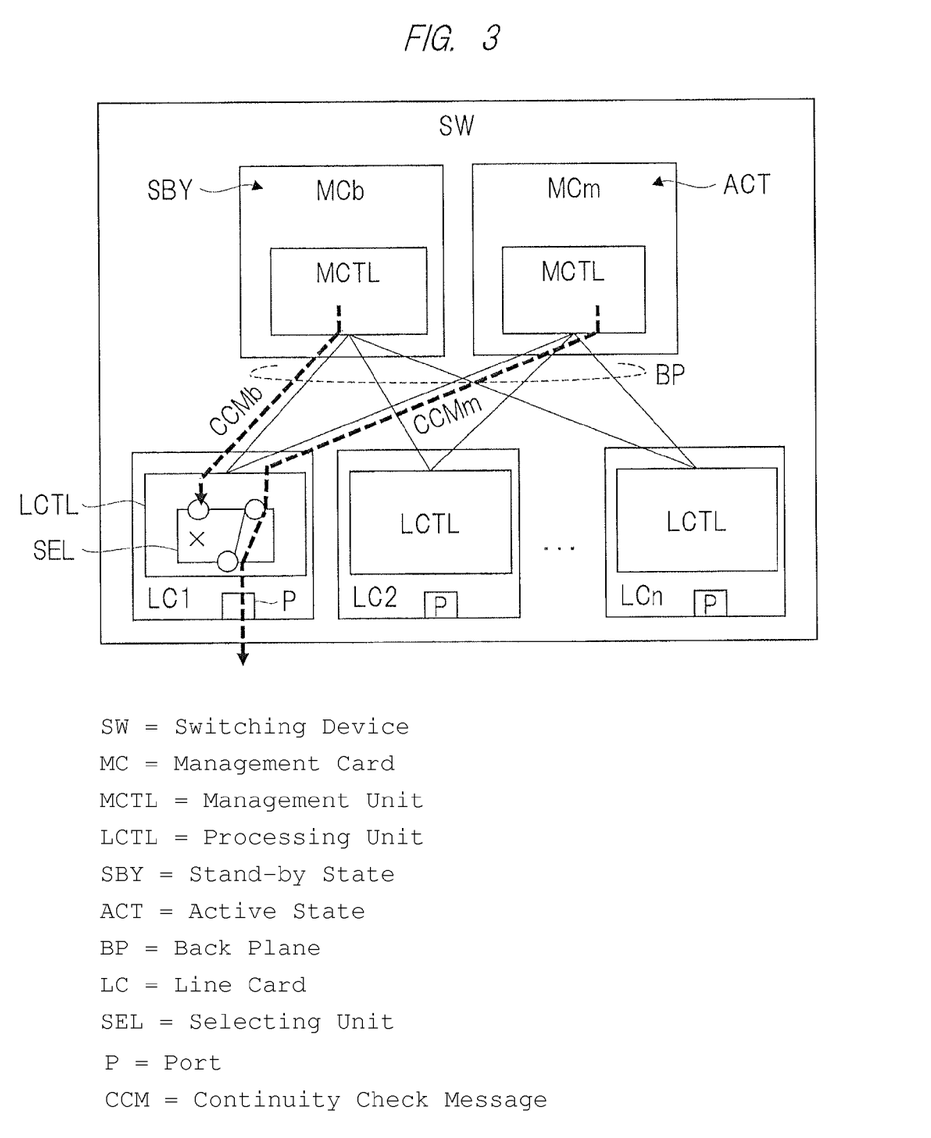
FIG. 3 is a schematic diagram showing an example of an operation which the switching device of FIG. 2 executes when transmitting a CCM frame.

FIG. 3 is a schematic diagram showing an example of an operation which the switching device of FIG. 2 executes when transmitting a CCM frame. The switching device of FIG. 3 has the same configuration as that of the switching device of FIG. 2, but the switching device is further provided with a transmission source selecting unit SEL in the processing unit LCTL of each of the line cards LC1 to LCn in FIG. 3. In this case, the transmission source selecting unit SEL in the line card LC1 is only shown as a representative, and the transmission source selecting units SEL in the line cards LC2 to LCn are not shown.

As shown in FIG. 3, the management units MCTL of the first and second management cards MCm and MCb both generate CCM frames (monitoring frames) CCMm and CCMb and transmit the CCM frames CCMm and CCMb to a given line card (line card LC1 in this case) among the plurality of lined cards. At this time, each management unit MCTL transmits the CCM frames CCMm and CCMb at a predetermined given transmission interval. On the other hand, when each of the plurality of line cards (LC1 in this case) has received the CCM frames CCMm and CCMb from both of the first and second management cards MCm and MCb, the line card selects one of the CCM frames CCMm and CCMb by using the transmission source selecting unit SEL, and transmits the selected CCM frame from the port P to a different switching device.

In this manner, it is possible to prevent a case where both CCM frames CCMm and CCMb are transmitted to a different switching device in an overlapped manner. Also, in this case, the first management card MCm serving as the master management card is in an active state ACT, and the second management card MCb serving as the backup management card is in a stand-by state SBY. When the first management card MCm has no fault, the transmission source selecting unit SEL gives priority to the first management card MCm serving as the master management card and selects the CCM frame CCMm transmitted from the first management card MCm. Meanwhile, though details thereof will be described later, when the first management card MCm has a fault and the second management card MCb has no fault, the transmission source selecting unit SEL selects the CCM frame CCMb transmitted from the second management card MCb. In this case, the second management card MCb shifts to the active state ACT and the first management card MCm shifts to the stand-by state SBY in an ex-post manner.

<<Continuity Monitoring Function in Switching Device (Network Relay Device)>>

Figure 4:
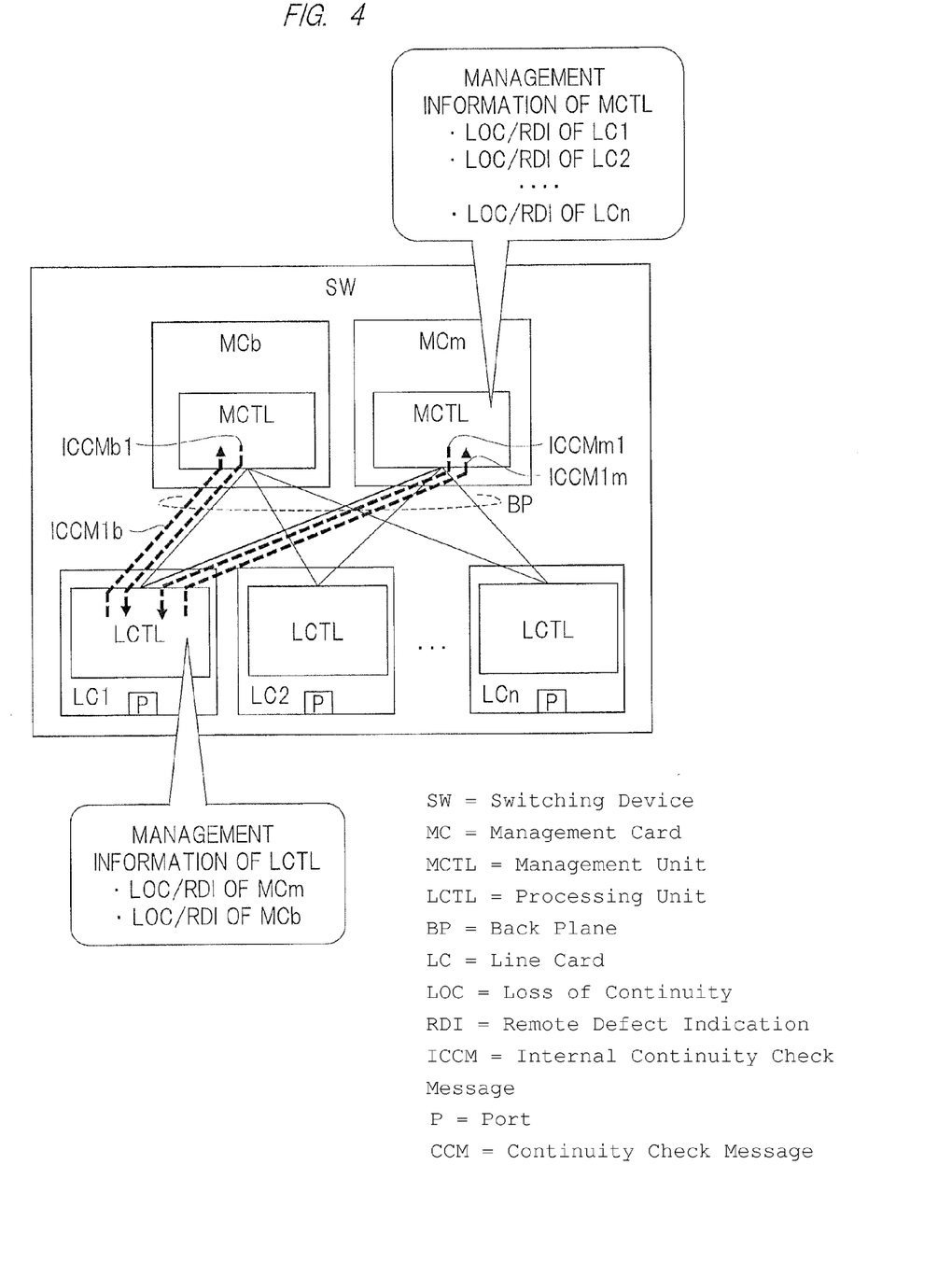
FIG. 4 is a schematic diagram showing an example of an operation which the switching device of FIG. 2 executes when monitoring continuity inside the device.

As shown in FIG. 3, the transmission source selecting unit SEL in the line card (line card LC1 in this case) selects a transmission source of a CCM frame in accordance with a fault occurrence status in the switching device. Therefore, in order to grasp the fault occurrence status in the switching device, the switching device SW carries out the continuity monitoring inside the device as shown in FIG. 4. FIG. 4 is a schematic diagram showing an example of an operation which the switching device in FIG. 2 executes when monitoring continuity inside the device.

As shown in FIG. 4, the management unit MCTL of each of the first and second management cards MCm and MCb transmits and receives an internal CCM frame (internal monitoring frame) ICCM to and from each of the plurality of line cards LC1 to LCn, thereby monitoring the continuity between each of the first and second management cards MCm and MCb and each of the line cards LC1 to LCn. Similarly, the processing unit LCTL of each of the line cards LC1 to LCn transmits and receives an internal CCM frame ICCM to and from each of the first and second management cards MCm and MCb, thereby monitoring the continuity between each of the line cards LC1 to LCn and each of the first and second management cards MCm and MCb.

Specifically, the processing unit LCTL of the line card LC1 transmits an internal CCM frame ICCM1$m$ to the management unit MCTL of the first management card MCm by unicast transmission. Similarly, the management unit MCTL of the first management card MCm transmits an internal CCM frame ICCMm1 to the processing unit LCTL of the line card LC1 by unicast transmission. When transmissions of both internal CCM frames are carried out normally, the line card LC1 sets management information of the first management card MCm to "normal state", and the first management card MCm also sets management information of the line card LC1 to "normal state". In the same manner, continuity monitoring using internal CCM frames is carried out on all communication paths between the line cards LC1 to LCn and the first and second management cards MCm and MCb.

Continuity monitoring using internal CCM frames can be realized by, for example, providing a function substantially the same as the CC (Continuity Check) function defined in the communication standards. However, it is desirable that a transmission interval of internal CCM frame (second transmission interval) is set to be shorter than a transmission interval of CCM frame (first transmission interval). This is because, though the details thereof will be described later, it is desirable to quickly detect an internal fault by using an internal CCM frame so as not to affect the transmission interval of CCM frame (first transmission interval). The transmission interval of CCM frame (first transmission interval) is defined to be selectable from several transmission intervals in the communication standards, and is, for example, 3.33 ms at the shortest. However, the transmission interval of CCM frame is generally set to be longer than it by several orders of magnitude (for example, 100 ms, 1 s and others) in many cases. On the other hand, the transmission interval of internal CCM frame (second transmission interval) is not particularly limited, but is set to be, for example, about 1.0 ms.

Figure 5:
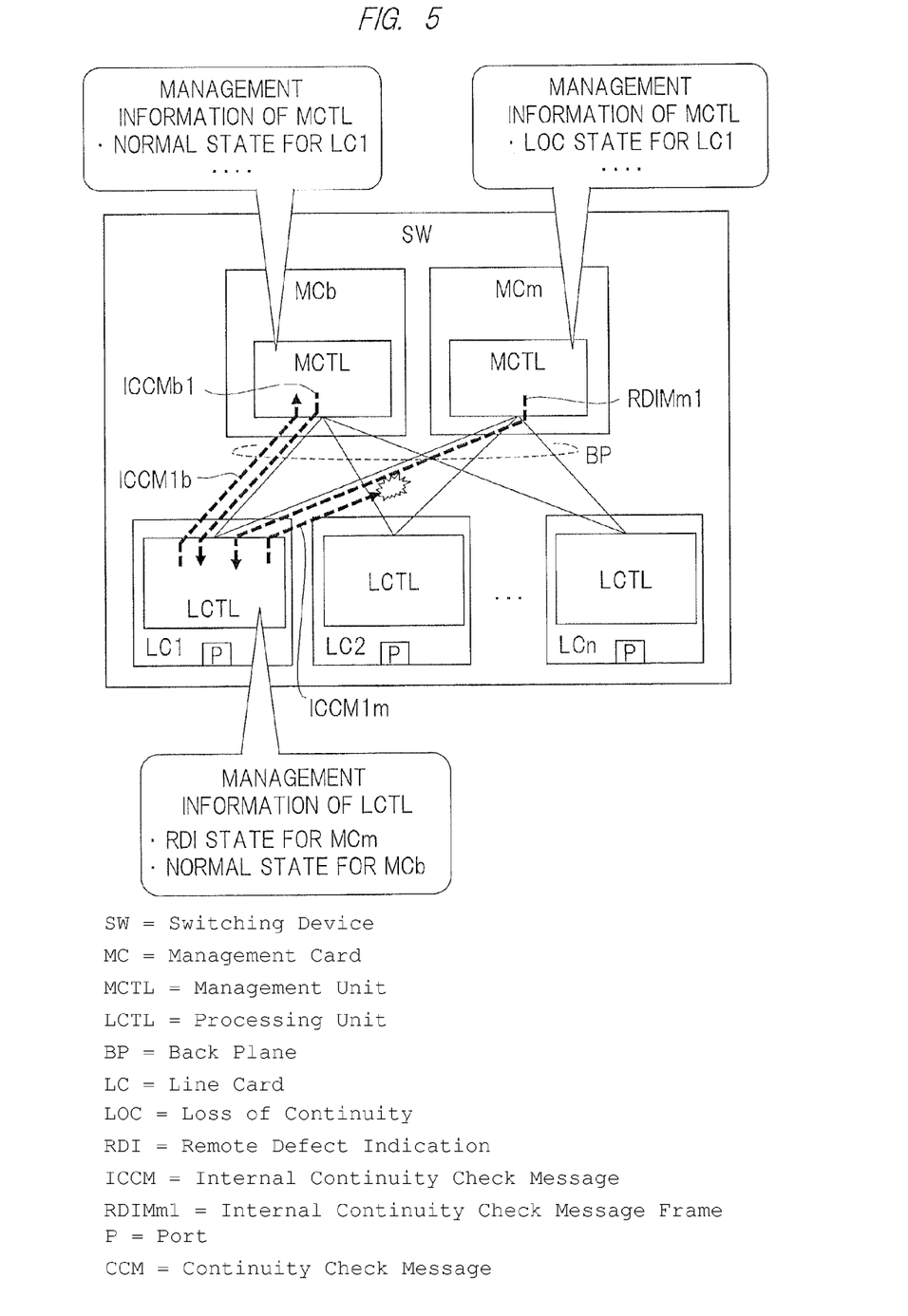
FIG. 5 is a schematic diagram showing an example of an operation which the switching device of FIG. 4 executes when a fault occurs inside the device.

FIG. 5 is a schematic diagram showing an example of an operation which the switching device of FIG. 4 executes when a fault occurs inside the device. As shown in FIG. 5, for example, when the first management card MCm has failed to receive an internal CCM frame (internal monitoring frame) ICCM1m transmitted from the line card LC1 in a given reception period, the first management card MCm sets management information of a transmission source (line card LC1) of the internal CCM frame ICCM1m to an LOC (Loss Of Continuity) state. The given reception period is set to be 3.5 times as long as the transmission interval of internal CCM frame (second transmission interval) in the same manner as the case of the CCM frame mentioned above.

On the other hand, when the management information of the line card LC1 is set to the LOC state, the first management card MCm attaches a flag to the RDI (Remote Defect Indication) bit of an internal CCM frame to be transmitted to the source of the LOC state (line card LC1). Afterward, the first management card MCm continues to transmit an internal CCM frame RDIMm1 having the flag attached to its RDI bit to the source of the LOC state (line card LC1) until the LOC state is canceled. While receiving the internal CCM frame RDIMm1 from the first management card MCm, the line, card LC1 sets the management information of the transmission source of the internal CCM frame RDIMm1 (first management card MCm) to an RDI state. This means that when management information of a card B is the LOC state in the management information stored in a certain card A, the card A cannot normally receive a frame from the card B, and when the management information of the card B is the RDI state, the card A cannot normally transmit a frame to the card B.

Note that although the method of monitoring the normal state and abnormal state using the internal CCM frame has been described here, the method of monitoring the normal state and abnormal state using the CCM frame shown in FIGS. 2 and 3 (that is, the CC function of Ethernet OAM) can be performed in the same manner except that the monitoring subject and the transmission interval are different. More specifically, in the Ethernet OAM, the mentoring subject is the switching device and the transmission interval is set to be longer than that in the case of the internal CCM frame.

<<Operation which Switching Device (Network Relay Device) Executes When Fault Occurs in Switching Device>>

Figure 6:
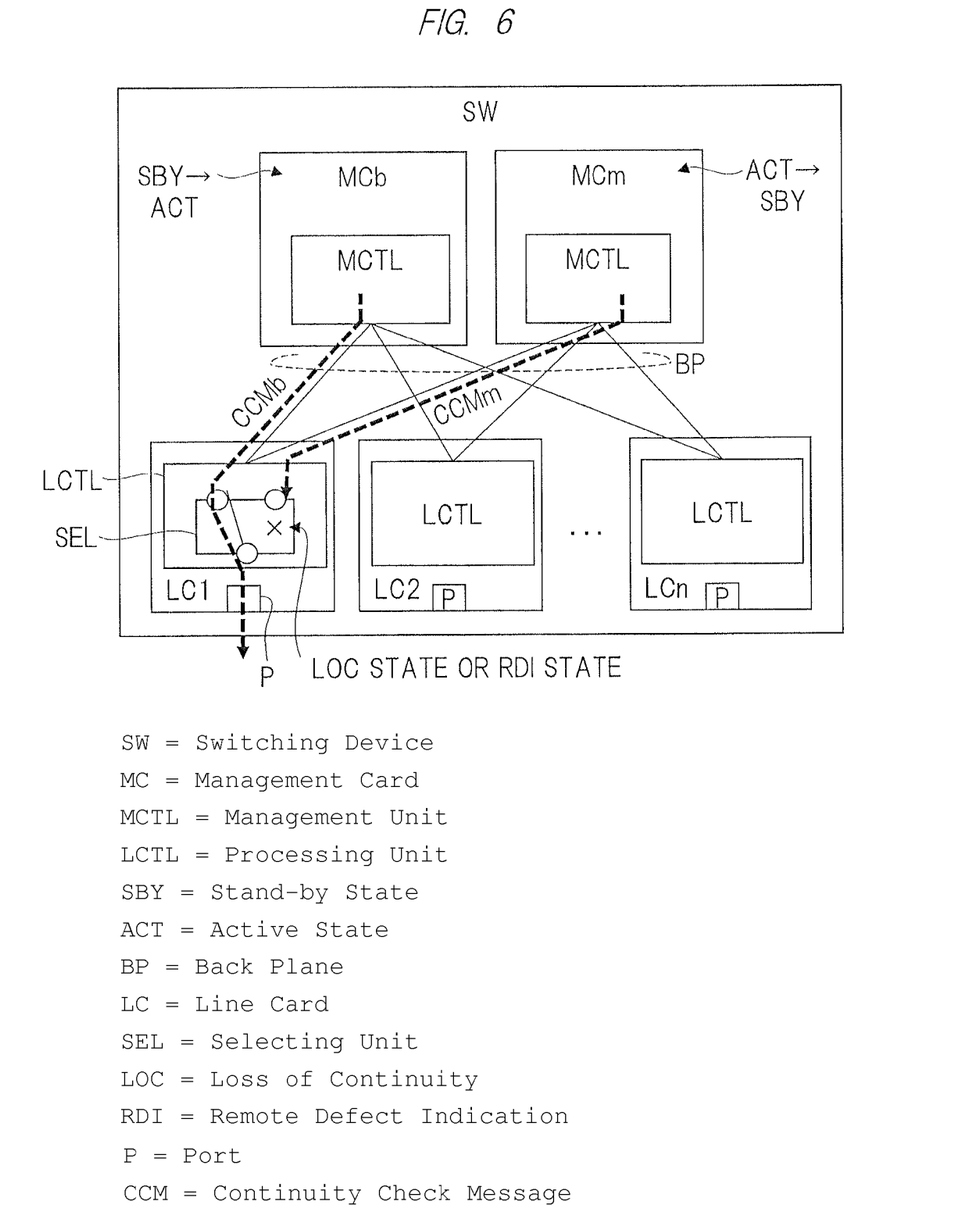
FIG. 6 is a schematic diagram showing an example of an operation which is executed when the fault of FIG. 5 occurs at the time of transmitting the CCM frame in FIG. 3.

FIG. 6 is a schematic diagram showing an example of an operation which is executed when the fault in FIG. 5 occurs at the time of transmitting the CCM frame in FIG. 3. As shown in FIG. 6, the transmission source selecting unit SEL in the processing unit LCTL of the line card LC1 selects one of the CCM frames CCMm and CCMb based on the result of continuity monitoring inside the device as shown in FIG. 5. Specifically, the transmission source selecting unit SEL first refers to its own management information (management information of the line card LC1 in this case) of the first management card MCm serving as the master management card and the second management card MCb serving as the backup management card. When the management information of the first management card MCm indicates the normal state (that is, neither the LOC state nor RDI state), the transmission source selecting unit SEL selects the CCM frame CCMm transmitted from the first management card MCm. When the management information of the first management card MCm indicates the abnormal state (that is, either the LOC state or RDI state) and the management information of the second management card MCb indicates the normal state, the transmission source selecting unit SEL selects the CCM frame CCMb transmitted from the second management card MCb.

Therefore, when the fault as shown in FIG. 5 occurs, the transmission source selecting unit SEL of the line card LC1 selects the CCM frame CCMb transmitted from the second management card MCb serving as the backup management card as shown in FIG. 6. In this case, after the operation of the transmission source selecting unit SEL (that is, in an ex-post manner), the second management card MCb shifts to the active state ACT and the first management card MCm serving as the master management card shafts to the stand-by state SBY. Furthermore, in response to that, the transmission source selecting units SEL of different line cards LC2 to LCn are also controlled to select the CCM frame CCMb transmitted from the second management card MCb in the active state ACT.

<<Major Effect of Method of this Embodiment>>

Figure 11A:
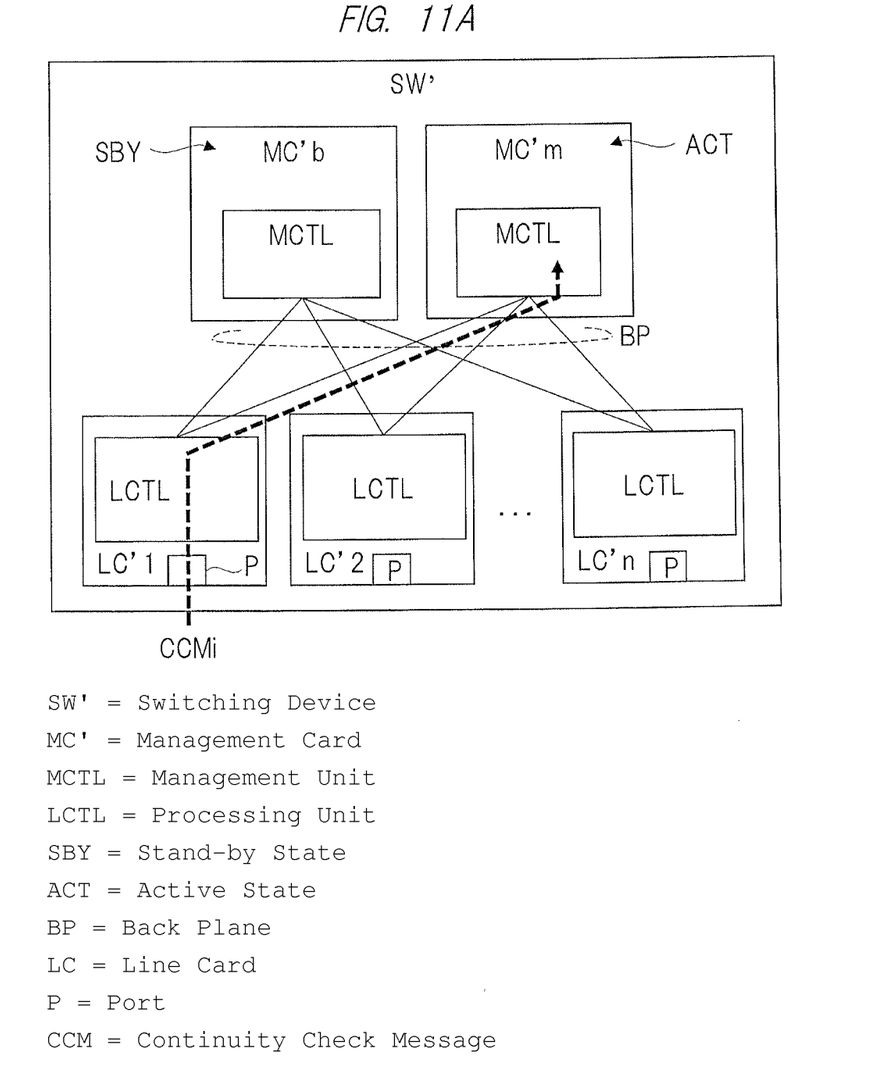
FIG. 11A is a schematic diagram showing an example of an operation which a switching device serving as a comparison example of the present invention executes when receiving a CCM frame.
Figure 11B:
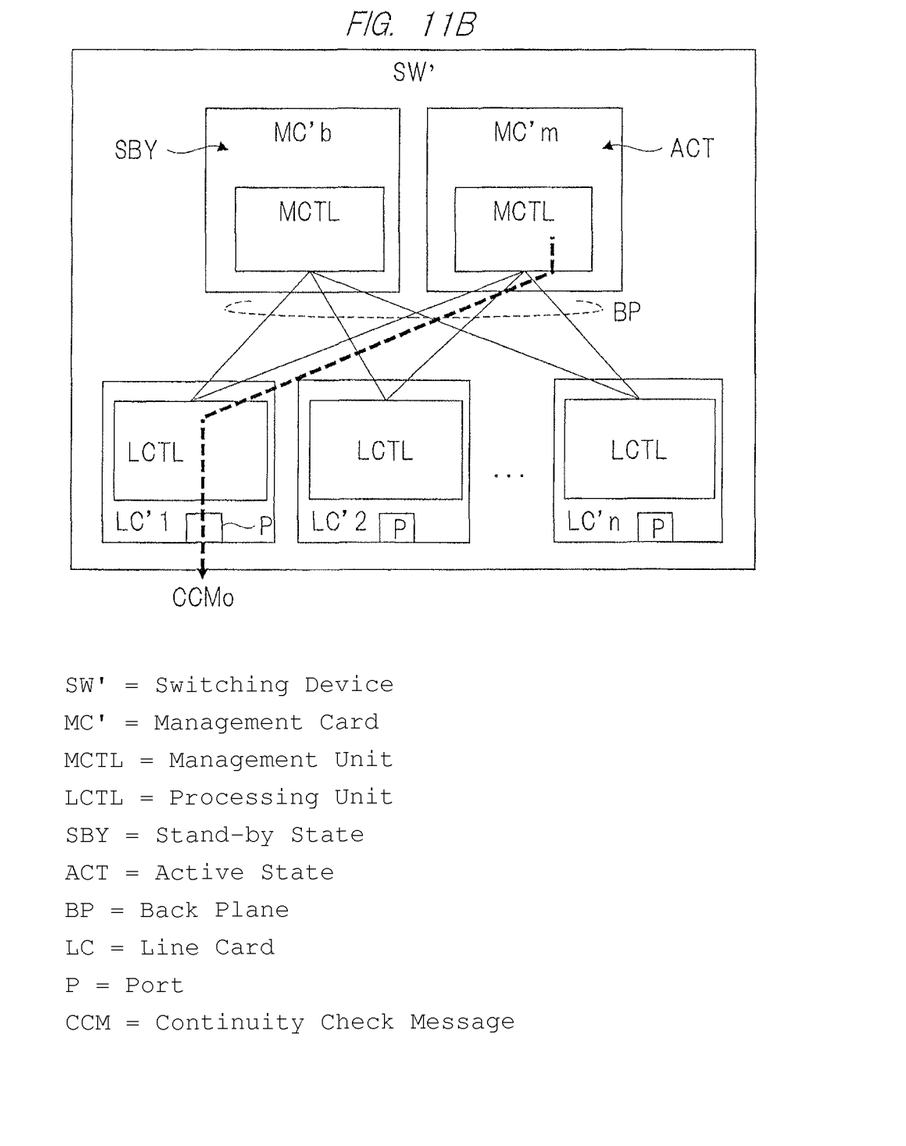
FIG. 11B is a schematic diagram showing an example of an operation which the switching device serving as a comparison example of the present invention executes when transmitting a CCM frame.

FIGS. 11A and 11B are schematic diagrams showing examples of operations which a switching device serving as a comparison example of the present invention executes when receiving and transmitting a CCM frame.

(1) Effect at Transmission of CCM Frame

As an operation method of a switching device SW' of a comparison example [1], as shown in FIG. 11B, only one of a management card MC'm serving as a master management card and a management card MC'b serving as a backup management card transmits a CCM frame CCMo. Specifically, only the management card in the active state ACT transmits the CCM frame CCMo. For example, when there is no fault, the management card MC'm in the active state ACT transmits the CCM frame CCMo, and when a fault occurs at the management card MC'm, the management card MC'b shifts to the active state ACT and transmits the CCM frame CCMo in place of the management card MC'm.

When this method is adopted, however, it takes a certain period until the management card MC'b serving as the backup management card shifts to the active state ACT, and that period is significantly longer than the given transmission interval of CCM frame in some cases. This leads to a problem that the switching device SW' is recognized as a faulty switching device by a different switching device. More specifically, since two management cards making up a redundant configuration are provided, the switching device as a whole must be regarded as a device in a normal state in the viewpoint of a different switching device even if a fault occurs at one of the management cards.

On the other hand, as shown in FIG. 3 and others, in the method used in the switching device SW of this embodiment, both of the first management card MCm and second management card MCb transmit CCM frames at the predetermined given transmission interval and the line card (LC1) selects one of the transmitted CCM frames. This method is different from the method of selecting a management card having shifted to the active state ACT shown in FIG. 11, and may be referred to as the method of selecting a management card that is to shaft to the active state ACT. Since this selection can be performed in a period sufficiently shorter than the given transmission interval, it hardly affects the given transmission interval of CCM frame. Note that, in order to perform the proper selection in a period sufficiently shorter than the given transmission interval of CCM frame, it is desirable to set the transmission interval of internal CCM frame to be sufficiently shorter than the transmission interval of CCM frame.

(2) Effect at Reception of CCM Frame

With respect to the CC function of Ethernet OAM, for example, when a switching device has failed to receive a CCM frame from a different switching device in the given reception period, the switching device needs to set the management information of that switching device to the LOC state as is the case with the continuity monitoring function inside the switching device described in FIGS. 4 and 5. Furthermore, the switching device also needs to transmit a CCM frame having a flag attached to its RDI bit to that different switching device. Such a process must be executed similarly regardless of the internal state of the switching device (for example, even when a fault occurs at the first management card serving as the master management card). To this end, the first management card MCm serving as the master management, card and the second management card MCb serving as the backup management card need to share the management information of the different switching device.

Here, as an operation method of a switching device SW' of a comparison example [2], as shown in FIG. 11A, a line card LC'1 having received a CCM frame CCMi from a different switching device transmits the CCM frame CCMi only to the management card in the active state ACT (to the management card MC'm serving as the master management card when it has no fault). In this case, for example, if a fault occurs at the management card MC'm, the management card MC'b serving as the backup management card needs to carry out a process of updating its own management information with management information of the different switching device held by the management card MC'm. The updating of the management information like this may take a certain period. As a result, there is possibility that the condition of the given transmission interval of CCM frame cannot be satisfied as is the case with the comparison example [1] described above.

On the other hand, in the switching device SW of this embodiment, as shown in FIG. 2 and others, the line card (for example, LC1) transmits a CCM frame CCMi coming from a different switching device to both of the first management card MCm serving as the master management card and the second management card MCb serving as the backup management card. Upon reception of the CCM frame CCMi, each of the management cards MCm and MCb can separately update its own management information of the different switching device. Therefore, when no fault occurs in the switching device, the management cards MCm and MCb can constantly share management information of the different switching device. As a result, for example, when a fault occurs at the management card MCm, the process of updating the management information described in FIG. 11A is not necessary, and the given transmission interval of CCM frame is not affected.

(3) Effect at Transmission and Reception of CCM Frame

As a result of the combined effects of (1) and (2) mentioned above, the first and second management cards MCm and MCb, which share the management information of a different switching device, generate the same CCM frames reflecting the management information at almost the same timing and transmit the CCM frames to a given line card at almost the same timing. In other words, the first and second management cards MCm and MCb execute the same process in synchronization with each other. When a fault occurs at the management card MCm, the shift is quickly carried out by the given line card as described in (1). As a result, the condition of the given transmission interval of CCM frame can be sufficiently satisfied, and it is possible to prevent the above-mentioned defect due to erroneous recognition of the switching device by a different switching device. Consequently, fault tolerance for the continuity monitoring function of Ethernet OAM can be improved.

<<Configuration and Operation of Line Card>>

Figure 7A:
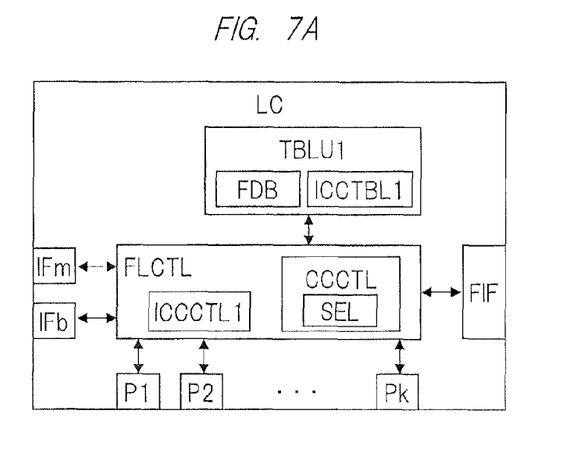
FIG. 7A is a block diagram schematically showing an example of a configuration of the principal part of a line card of the switching device of FIG. 2.
Figure 7B:
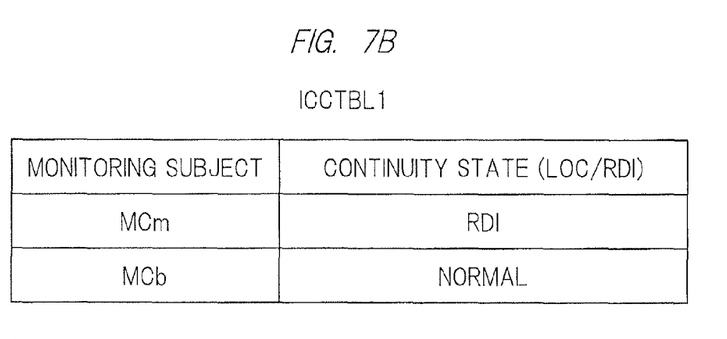
FIG. 7B is a schematic diagram showing an example of a configuration of an internal continuity monitoring table in FIG. 7A.

FIG. 7A is a block diagram schematically showing an example of a configuration of the principal part of a line card of the switching device of FIG. 2, and FIG. 7B is a schematic diagram showing an example of a configuration of an internal continuity monitoring table in FIG. 7A. The line card LC shown in FIG. 7A has, for example, a frame processing unit FLCTL, a table unit TBLU1, a plurality of ports P1, P2, . . . , Pk, management card interfaces IFm and IFb, and a fabric interface FIF. The frame processing unit FLCTL and the table unit TBLU1 correspond to the processing unit LCTL of FIG. 2. Although a line card having a plurality of ports is taken as an example here, the line card is not always limited thereto, but other types of line cards may have only one port capable of carrying out high-speed communication.

In the case of the line card LC1 of FIG. 2, for example, the plurality of ports P1, P2, . . . , Pk are connected properly to different switching devices via communication lines, and the management card interfaces IFm and IFb are connected to the first and second management cards MCm and MCb via internal communication lines, respectively. Also, the fabric interface FIF is connected to the line cards LC2 to LCn via internal communication lines. The internal communication lines are disposed on the back plane BP described in FIG. 2.

The table unit TBLU1 retains an address table FDB, an internal continuity monitoring table ICCTBL1 and others. The address table FDB is composed of hardware such as a CAM (Content Addressable Memory), and stores information of the relation between each port and a MAC (Media Access Control) address of a device, terminal, and others present ahead of each port. The internal continuity monitoring table ICCTBL1 stores a failure occurrence status inside the device obtained by the process described in FIG. 5. For example, the internal continuity monitoring table ICCTBL1 stores continuity states (LOC state, PDT state, normal state) of the first and second management cards MCm and MCb serving as monitoring subjects as shown in FIG. 7B.

The frame processing unit FLCTL has an internal continuity monitoring unit (second internal continuity monitoring unit) ICCCTL1 and a monitoring frame processing unit CCCTL, and the monitoring frame processing unit CCCTL is provided with the transmission source selecting unit SEL shown in FIG. 3. In addition to processes of the internal continuity monitoring unit ICCCTL1 and the monitoring frame processing unit. CCCTL, the frame processing unit FLCTL performs relay of a frame between the ports P1, P2, . . . , Pk and relay of a frame between the line card LC1 and other line cards via the fabric interface FIF based on the address table FDB in the table unit TBLU1. The internal continuity monitoring unit ICCCTL1 transmits and receives an internal CCM frame (internal monitoring frame) ICCM to and from the first and second management cards MCm and MCb, thereby monitoring the continuity with the first and second management cards MCm and MCb as described in FIG. 5. Then, the internal continuity monitoring unit ICCCTL1 stores the monitoring result in the internal continuity monitoring table ICCTBL1 mentioned above.

Figure 8A:
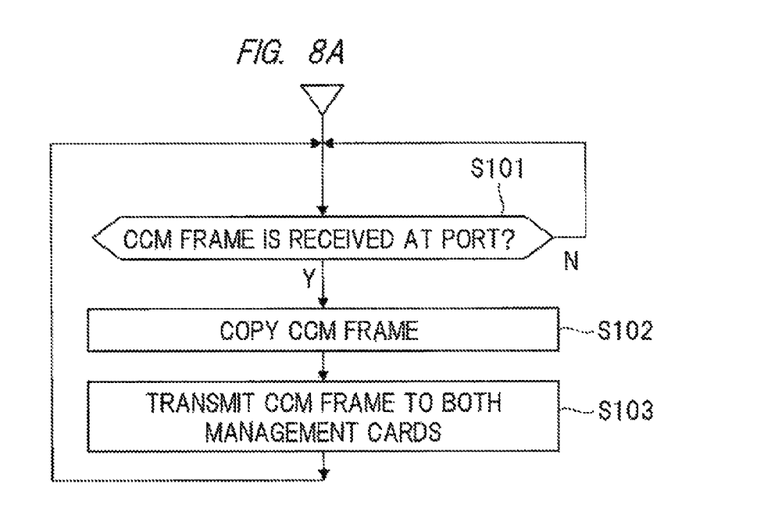
FIG. 8A is a flowchart schematically showing an example of an operation of a monitoring frame processing unit in FIG. 7A.
Figure 8B:
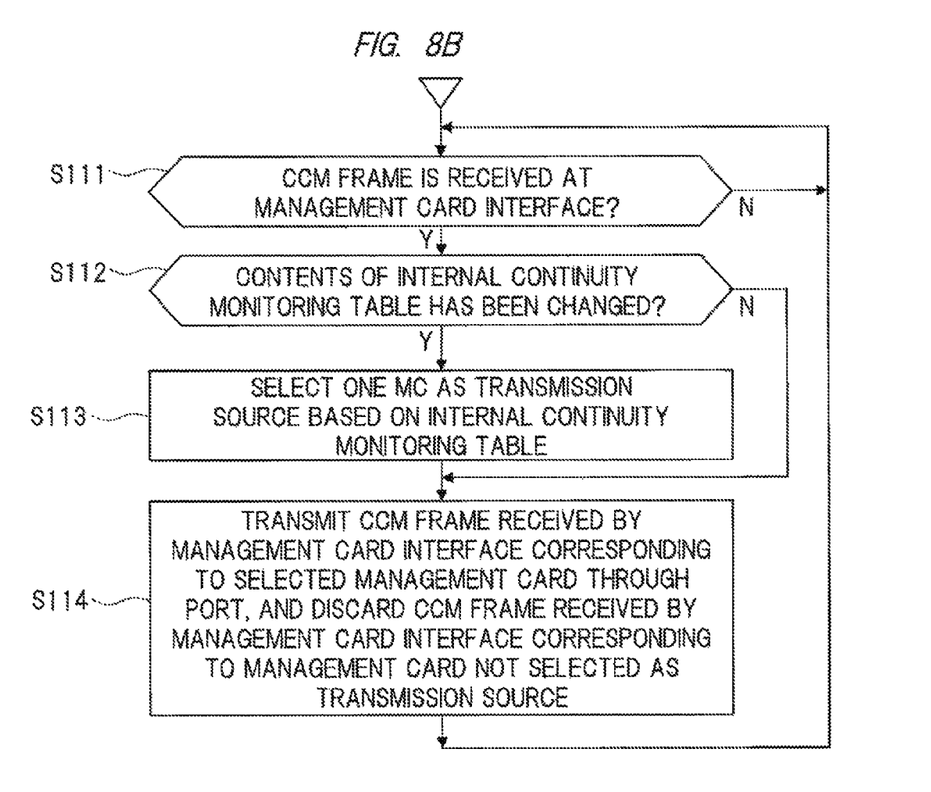
FIG. 8B is a flowchart schematically showing an example of an operation of a monitoring frame processing unit in FIG. 7A.

FIGS. 8A and 8B are flowcharts schematically showing an example of an operation of the monitoring frame processing unit in FIG. 7A. FIG. 8A shows an example of an operation at reception of a CCM frame (monitoring frame), and FIG. 8B shows an example of an operation at transmission of a CCM frame. In FIG. 8A, the monitoring frame processing unit CCCTL determines whether a frame received at a given port among the plurality of ports P1, P2, . . . , Pk is a CCM frame (monitoring frame) (step S101). When the received frame is a CCM frame, the monitoring frame processing unit CCCTL copies the CCM frame (step S102) and transmits the CCM frame to both of the first and second management cards MCm and MCb via the management card interfaces IFm and IFb (step S103) as shown in FIG. 2. Subsequently, the monitoring frame processing unit CCCTL returns to step S101, and starts repeating the same process.

In FIG. 8B, the transmission source selecting unit SEL in the monitoring frame processing unit CCCTL determines whether CCM frames (monitoring frame) from the first and second management cards MCm and MCb are received at the management card interfaces IFm and ifEb (step S111). When the CCM frames are received at the interfaces IFm and IFb, the transmission source selecting unit SEL determines whether there is any change in the contents of the internal continuity monitoring table ICCTBL1 (step S112). When there is no change, the transmission source selecting unit SEL proceeds to step S114. When there is any change, the transmission source selecting unit SEL selects one of the first and second management cards MCm and MCb as a transmission source based on the monitoring result by the internal continuity monitoring unit (second internal continuity monitoring unit) ICCTLL1 (that is, based on the internal continuity monitoring table ICCTBL1) as described in FIG. 6, and then proceeds to step S114 (step S113).

Subsequently, at step S114, the transmission source selecting unit SEL transmits a CCM frame (monitoring frame) received by one of the interfaces IFm and IFb corresponding to the selected management card through a given port, and discards a CCM frame received by the other of the interfaces IFm and IFb corresponding to the management card not selected as the transmission source (step S114). Subsequently, the transmission source selecting unit SEL returns no step S111, and starts repeating the same process. As described above, when having received respective CCM frames from both of the first and second management cards MCm and MCb, the transmission source selecting unit SEL selects one of the received CCM frames and transmits the selected CCM frame from the given port. At this time, the transmission source selecting unit SEL selects one of the CCM frames based on the monitoring result by the internal continuity monitoring unit (second internal continuity monitoring unit) ICCCTL1 (that is, based on the internal continuity monitoring table ICCIBL1).

<<Configuration and Operation of Management Card>>

Figure 9A:
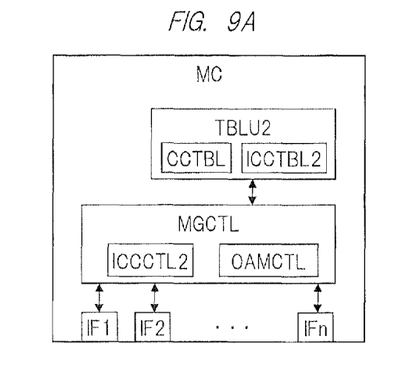
FIG. 9A is a block diagram schematically showing an example of a configuration of the principal part of a management card of the switching device of FIG. 2.
Figure 9B:
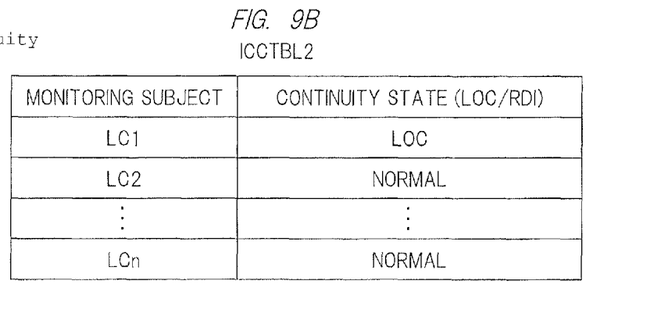
FIG. 9B is a schematic diagram showing an example of a configuration of an internal continuity monitoring table in FIG. 9A.
Figure 9C:
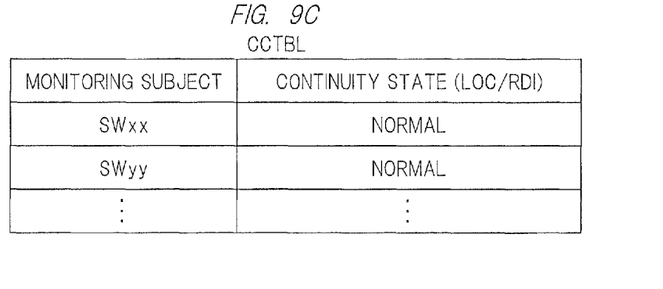
FIG. 9C is a schematic diagram showing an example of a configuration of a continuity monitoring table in FIG. 9A.

FIG. 9A is a block diagram schematically showing an example of a configuration of the principal part of a management card of the switching device of FIG. 2, FIG. 9B is a schematic diagram showing an example of a configuration of an internal continuity monitoring table in FIG. 9A, and FIG. 9C is a schematic diagram showing an example of a configuration of a continuity monitoring table in FIG. 9A. A management card MC shown in FIG. 9A has, for example, a device management unit MGCTL, a table unit TBLU2, and a plurality of line card interfaces IF1 and IF2, . . . , IFn. The device management unit MGCTL and the table unit TBLU2 correspond to the management unit MCTL of FIG. 2. In the case of the first management card MCm of FIG. 2, for example, the interfaces IF1 and IF2, . . . , IFn are connected to the line cards LC1, LC2 . . . LCn via internal communication lines, respectively. The internal communication lines are disposed on the back plane BP shown in FIG. 2.

The table unit TBLU2 retains a continuity monitoring table CCTBL, ac internal continuity monitoring table ICCTBL2, and others. The internal continuity monitoring table ICCTBL2 stores a failure occurrence status inside the device obtained by the process shown in FIG. 5. For example, the internal continuity monitoring table ICCTBL2 stores continuity states (LOC state, RDI state, normal state) of the line cards LC1, LC2, . . . , and LCn serving as monitoring subjects as shown in FIG. 9B. The continuity monitoring table current stores the status of failure occurrence with other switching devices obtained by the process similar to the process of FIG. 5. For example, the continuity monitoring table CCTBL stores continuity states (LOC state, RDI state, normal state) of other switching devices (SWxx, SWyy, . . . ) serving as monitoring subjects as shown in FIG. 9C.

The device management unit MGCTL has a continuity monitoring unit OAMCTL and an internal continuity monitoring unit (first internal continuity monitoring unit) ICCCTL2. In addition to processes of the continuity monitoring unit OAMCIL and the internal continuity monitoring unit ICCCTL2, the device management unit MGCTL carries out overall management of the switching device including management of various settings, operation conditions, and others of the plurality of line cards. The internal continuity monitoring unit ICCCTL2 transmits and receives an internal CCM frame (internal monitoring frame) to and from each of the plurality of line cards LC1, LC2, . . . , LCn, thereby monitoring the continuity with each of the plurality of line cards as described in FIG. 5. Then, the internal continuity monitoring unit ICCCTL2 stores the monitoring result in the internal continuity monitoring table ICCTBL2.

Figure 10A:
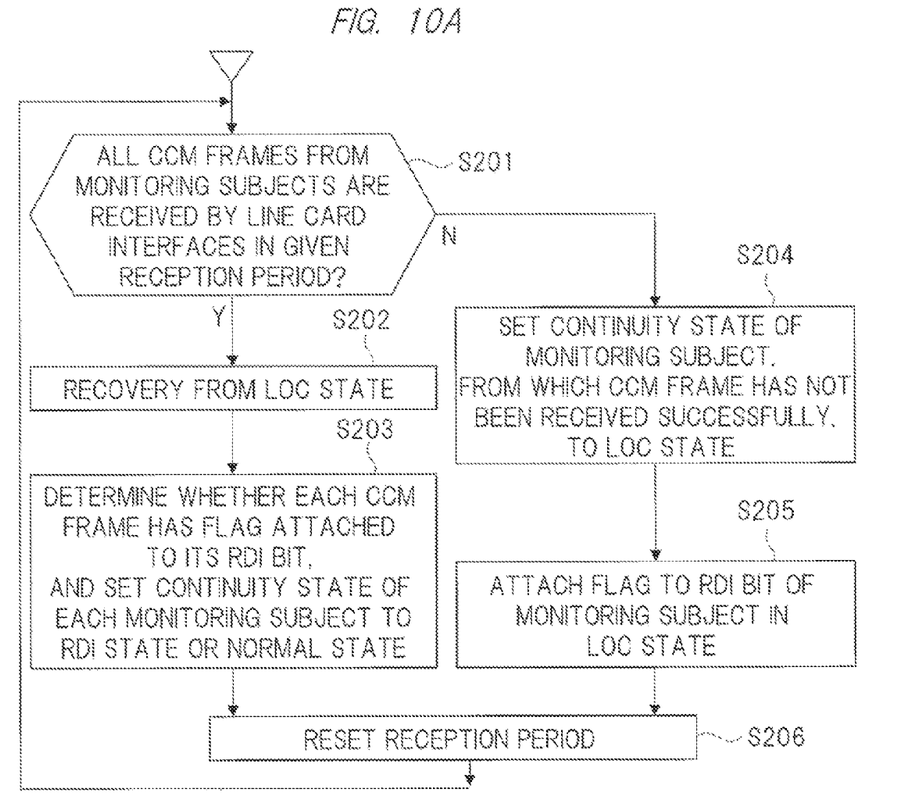
FIG. 10A is a flowchart schematically showing an example of an operation of the continuity monitoring unit in FIG. 9A.
Figure 10B:
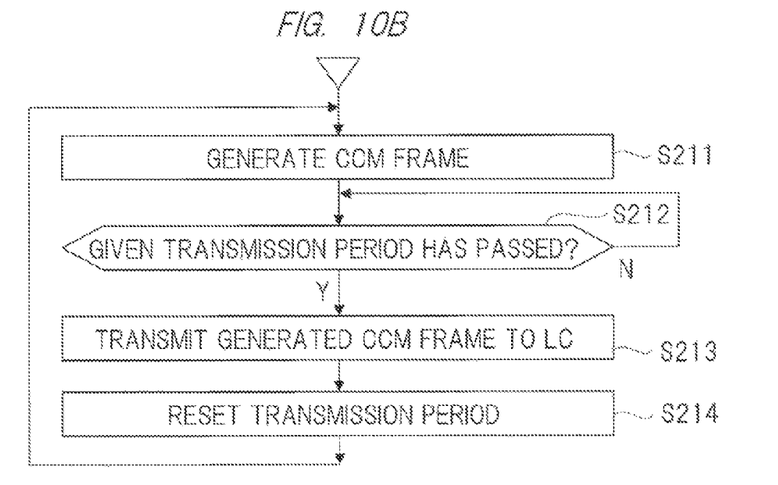
FIG. 10B is a flowchart schematically showing an example of an operation of the continuity monitoring unit in FIG. 9A.

FIGS. 10A and 10B are flowcharts schematically showing an example of an operation of the continuity monitoring unit in FIG. 9A. FIG. 10A shows an example of an operation at reception of a CCM frame (monitoring frame), and FIG. 10B shows an example of an operation at transmission of a CCM frame. In FIG. 10A, the continuity monitoring unit OAMCTL determines whether all CCM frames from monitoring subjects (management points MEP of FIG. 1) have been received by the line card interfaces IF1, IF2, . . . , IFn in a given reception period (step S201). When there is a monitoring subject from which a CCM frame is not received successfully, the continuity monitoring unit OAMCTL sets the continuity state of the monitoring subject to the LOC state in the continuity monitoring table CCTBL (step S204). Subsequently, the continuity monitoring unit OAMCTL attaches a flag to the RDI bit of the monitoring subject in the LOC state (step S205).

On the other hand, when there is no monitoring subject from which a CCM frame is not received successfully at step S201, the continuity monitoring unit OAMCTL changes the continuity state of the monitoring subject, which has been set to the LOC state at step 3204, to the normal state (step 3202). Then, the continuity monitoring unit OAMCTL determines whether each CCM frame received at step S201 has a flag attached to its RDI bit. In the continuity monitoring table CCTEL, the continuity monitoring unit OAMCTL sets the continuity state of the monitoring subject serving as a transmission source of a CCM frame having the flag to the RDI state and the continuity state of the monitoring subject serving as a transmission source of a CCM frame not having the flag to the normal state, respectively (step S203). After step S203 or step S205, the continuity monitoring unit OAMCTL resets the reception period, and returns to step S201 (step S206).

Also, in FIG. 10B, the continuity monitoring unit OAMCTL, generates a CCM frame (monitoring frame) (step S211). At this time, a CCM frame having a flag attached to its RDI bit is generated for a monitoring subject corresponding to that at step S205 of FIG. 10A. Next, after a given transmission period has passed (step S212), the continuity monitoring unit OAMCTI, transmits the CCM frame generated at step S211 to a given line card (step S213). Although not particularly limited, for example, the continuity monitoring unit OAMCTL transmits the CCM frame to the monitoring subject corresponding to that at step S205 of FIG. 10A by unicast transmission and to other monitoring subjects by multicast transmission. Subsequently, the continuity monitoring unit resets the transmission period, and returns to step S211 (step S214).

The process contents shown in FIGS. 8A and 8B and the process contents shown in FIGS. 10A and 10B are not particularly limited to these, and various modifications and alterations can be made. More specifically, any line card and management card can be adopted as long as they have the functions of executing the processes shown in FIGS. 2 to 6, and any process contents of the CCM frame between switching devices can be adopted as long as they are based on the Ethernet OAM communication standards.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A network relay device comprising:
a plurality of line cards each of which has a port and relays a frame;
a first management card connected to each of the plurality of line cards and managing the plurality of line cards; and
a second management card connected to each of the plurality of line cards and managing the plurality of line cards,
wherein one of the first and second management cards serves as a main management card and an other of the first and second management cards serves a backup management card which is used when the main management card has a fault,
each of the first and second management cards has a continuity monitoring unit which generates a monitoring frame for checking continuity between devices and transmits the monitoring frame to a given line card among the plurality of line cards, and
each of the plurality of line cards has a monitoring frame processing unit which, when having received the monitoring frames from both of the first and second management cards, selects one of both monitoring frames and transmits the selected monitoring frame from the port.

2. The network relay device according to claim 1,
wherein each of the first and second management cards further has a first internal continuity monitoring unit which transmits and receives an internal monitoring frame to and from each of the plurality of line cards, thereby monitoring continuity with each of the plurality of line cards,
each of the plurality of line cards further has a second internal continuity monitoring unit which transmits and receives the internal monitoring frame to and from each of the first and second management cards, thereby monitoring continuity with each of the first and second management cards, and
the monitoring frame processing unit selects one of both monitoring frames based on a monitoring result by the second internal continuity monitoring unit.

3. The network relay device according to claim 2,
wherein, when having received a monitoring frame for checking continuity between devices, the monitoring frame being generated by a different device, through the port, the monitoring frame processing unit transmits the monitoring frame to both of the first and second management cards.

4. The network relay device according to claim 3,
wherein the continuity monitoring unit generates the monitoring frame at a first transmission interval, and
the first and second internal continuity monitoring units generate the internal monitoring frame at a second transmission interval shorter than the first transmission interval.

5. A network relay device comprising:
a plurality of line cards each of which has a port and relays a frame;
a first management card connected to each of the plurality of line cards and managing the plurality of line cards; and
a second management card connected to each of the plurality of line cards and managing the plurality of line cards,
wherein one of the first and second management cards is a main management card and an other of the first and second management cards is a backup management card which is used when the main management card has a fault, and
when having received a monitoring frame for checking continuity between devices, the monitoring frame being generated by a different device, through the port, each of the plurality of line cards transmits the monitoring frame to both of the first and second management cards.

* * * * *